United States Patent
Okuno (10) Patent No.: US 10,789,187 B2
(45) Date of Patent: Sep. 29, 2020

(54) I/O MANAGEMENT APPARATUS

(71) Applicant: OMRON Corporation, Kyoto (JP)

(72) Inventor: Makoto Okuno, Kusatsu (JP)

(73) Assignee: OMRON Corporation, Kyoto (JP)

( * ) Notice: Subject to any disclaimer, the term of this patent is extended or adjusted under 35 U.S.C. 154(b) by 84 days.

(21) Appl. No.: 16/188,292

(22) Filed: Nov. 13, 2018

(65) Prior Publication Data

US 2019/0258595 A1    Aug. 22, 2019

(30) Foreign Application Priority Data

Feb. 22, 2018   (JP) ................................ 2018-030046

(51) Int. Cl.
| | |
|---|---|
| *G06F 3/00* | (2006.01) |
| *G06F 13/20* | (2006.01) |
| *G06F 3/0484* | (2013.01) |
| *G05B 19/042* | (2006.01) |

(52) U.S. Cl.
CPC ......... *G06F 13/20* (2013.01); *G05B 19/0423* (2013.01); *G06F 3/04847* (2013.01); *G05B 2219/1105* (2013.01); *G05B 2219/1138* (2013.01); *G05B 2219/11101* (2013.01)

(58) Field of Classification Search
CPC ...... G06F 13/00; G06F 3/04847; G06F 13/20; G05B 19/0423; H04L 49/9005
USPC ........................... 710/8, 56, 20, 5, 36; 711/1
See application file for complete search history.

(56) References Cited

U.S. PATENT DOCUMENTS

| | | | | |
|---|---|---|---|---|
| 5,951,658 A | * | 9/1999 | Daray, Jr. ............. | G06F 9/5016 710/52 |
| 2007/0143395 A1 | * | 6/2007 | Uehara ................. | G06F 13/385 709/203 |
| 2015/0234753 A1 | * | 8/2015 | Tokito .................. | G05B 19/054 710/8 |
| 2017/0329300 A1 | | 11/2017 | Takahashi | |

FOREIGN PATENT DOCUMENTS

| | | |
|---|---|---|
| EP | 3012697 | 4/2016 |
| JP | 2017162108 | 9/2017 |

OTHER PUBLICATIONS

"Search Report of Europe Counterpart Application", dated May 24, 2019, p. 1-p. 9.
David Herres—, "Memory depth and sampling rate in oscilloscopes," Jul. 8, 2015, Available at: https://www.testandmeasurementtips.com/memory-depth-and-sampling-rate-in-oscilloscopes/.

* cited by examiner

*Primary Examiner* — Tim T Vo
*Assistant Examiner* — Kim T Huynh
(74) *Attorney, Agent, or Firm* — JCIPRNET (57) ABSTRACT

Problems such as an operation stop of a controller caused by leaving out a mismatch requiring a change can be prevented. When a setting value is changed in a unit operation setting, an allocation management part specifies a storage capacity required for a storage of input data based on the changed setting value, and judges whether a mismatch occurs in an allocation state between the input data and a storage area specified in an I/O allocation setting.

20 Claims, 7 Drawing Sheets

61: Unit operation setting

| Item | Setting value |
|---|---|
| Item A (sampling number) | Value A1 (10 [times]) |
| Item B | Value B1 |
| Item C | Value C2 |
| ⋮ | ⋮ |

FIG. 3

62: Profile information

| Item | Setting value | Necessary entry |
|---|---|---|
| Item A (sampling number) | 1-10 | Entry EN011 |
| | 11-20 | Entries EN011 and EN012 |
| | 21-30 | Entries EN011-EN013 |
| Item B | 1-B1 | Entry EN021 |
| | B2-B3 | Entries EN021 and EN022 |
| | B4-B5 | Entries EN021-EN023 |
| Item C | 1-C1 | Entry EN031 |
| | C2-C3 | Entries EN031 and EN032 |
| | C4-C5 | Entries EN031-EN033 |
| ⋮ | ⋮ | ⋮ |

FIG. 4

63: Entry storage area correspondence table

| Entry | Storage area | Size [byte] |
|---|---|---|
| Entry EN011 | 0x600101 | 20 |
| Entry EN012 | 0x600102 | 10 |
| Entry EN013 | 0x600103 | 20 |
| ⋮ | ⋮ | ⋮ |

FIG. 5

64: I/O allocation setting (before mismatch elimination)

| ch | Item | Allocated entry |
|---|---|---|
| ch1 | Item A | Entry EN011 |
| | Item B | Entry EN021 |
| | Item C | Entry EN031 |
| | Item C | Entry EN032 |
| | Item D | Entry EN041 |
| | ⋮ | ⋮ |

FIG. 6

64: I/O allocation setting (after mismatch elimination)

| ch | Item | Allocated entry |
|---|---|---|
| ch1 | Item A | Entry EN011 |
| | Item A | Entry EN012 |
| | Item B | Entry EN021 |
| | Item C | Entry EN031 |
| | Item D | Entry EN041 |
| | ⋮ | ⋮ |

FIG. 7

65: I/O map

| Port P1 | I/O allocation setting |
|---|---|
| Port P2 | I/O allocation setting |
| Port P3 | I/O allocation setting |
| Port P4 | I/O allocation setting |
| ⋮ | ⋮ |

FIG. 8

12A: Setting screen

12a: Port P1 ▽    Editing start button /12b

| ch | Item | Set value |
|---|---|---|
| ch1 | Item A (sampling number) | Value A1 (10 [times]) |
| | Item B | Value B1 |
| | Item C | Value C2 |
| | ⋮ | ⋮ |
| ch2 | Item A (sampling number) | Value A1 (10 [times]) |
| | Item B | Value B1 |
| | Item C | Value C1 |
| | ⋮ | ⋮ |

12C: I/O allocation situation screen (before mismatch elimination)

| Select | Entry | Size | ch | Item | Set value |
|---|---|---|---|---|---|
| ☑ | EN011 | 20[byte] | ch1 | Item A | Value A2 (20 [times]) |
| ☑ | EN031 | 20[byte] | ch1 | Item C | Value C1 |
|  | EN032 | 10[byte] | ch1 | Item C | Value C1 |

Port P1 | mismatch eliminating button

OK  Cancel

FIG. 12

12C: I/O allocation situation screen (after mismatch elimination)

| Select | Entry | Size | ch | Item | Setting value |
|---|---|---|---|---|---|
| ☐ | EN011 | 20[byte] | ch1 | Item A | Value A2 (20 [times]) |
|  | EN012 | 10[byte] | ch1 | Item A | Value A2 (20 [times]) |
| ☐ | EN031 | 20[byte] | ch1 | Item C | Value C1 |

Port P1 | mismatch eliminating button

OK  Cancel

I/O MANAGEMENT APPARATUS

CROSS-REFERENCE TO RELATED APPLICATION

The present application is related to and claims priority from Japanese patent application no. 2018-030046, filed on Feb. 22, 2018. The entire contents of the aforementioned application are hereby incorporated by reference herein.

BACKGROUND

Technical Field

The disclosure relates to an I/O management apparatus.

Related Art

In a factory, an I/O module unit is used to control various control object apparatuses.

As disclosed in Japanese Laid-open No. 2017-162108, the I/O module unit includes a plurality of sensors arranged on a control object apparatus, a plurality of I/O units which is connected to the plurality of sensors and acquires analog information from the plurality of sensors, and a controller which is connected to the plurality of I/O units and acquires a signal from each I/O unit. Furthermore, the I/O module unit includes a management apparatus, and drive of the controller and each I/O unit is controlled by the management apparatus.

The controller herein includes a storage part for storing an input signal transferred from the I/O unit. In the storage part of the controller, a storage area of the input signal is allocated to each of the sensors connected to the I/O unit.

Therefore, conventionally, a user cannot change a setting value (for example, a value of sampling number, a value of sampling length and the like) of the input signal for each of the sensors connected to the I/O unit. Therefore, it is inconvenient.

For example, if simply enabling to change the setting value (for example, the value of sampling number, the value of sampling length and the like) of the input signal for each of the sensors connected to the I/O unit, there is a possibility of exceeding a capacity of the storage area allocated to the storage part of the controller. In order to prevent such a mismatch, if the setting value is changed, accordingly, it is necessary that the user considers the storage capacity of the input signal transferred to the controller based on the setting value and changes the capacity of the storage area which is allocated as a transfer destination of the input signal.

However, it takes time for the user to determine whether a mismatch occurs between the storage capacity required for the storage of the input signal and the storage capacity of the storage area which is allocated as the transfer destination of the input signal along with the change of the setting value, and there may be occasions that an occurrence of the mismatch is overlooked by some users.

One embodiment of the disclosure is directed to above issues such as an operation stop or an incorrect operation of the controller caused by leaving out a mismatch that requires a change.

SUMMARY

In view of above, an I/O management apparatus which manages an I/O unit to which input devices are connected and a controller which controls the I/O unit. The I/O management apparatus includes an I/O management information storing part and an allocation management part. The I/O management information storing part stores a unit operation setting, indicating a relation between input data that is acquired and transferred from the input device by the I/O unit and a setting value related to the input data; and an I/O allocation setting, indicating a relation between the input data and specification information that specifies a storage area, wherein the storage area is within a plurality of storage areas included in a storage part of a transfer destination to which the input data is transferred by the I/O unit and is allocated as the transfer destination of the input data. The allocation management part judges, when the setting value is changed in the unit operation setting, whether a mismatch occurs in an allocation state between the input data and the storage area specified in the I/O allocation setting by specifying a storage capacity required for a storage of the input data based on the changed setting value.

DESCRIPTION OF THE EMBODIMENTS

§ 1 Application Example

Figure 1:
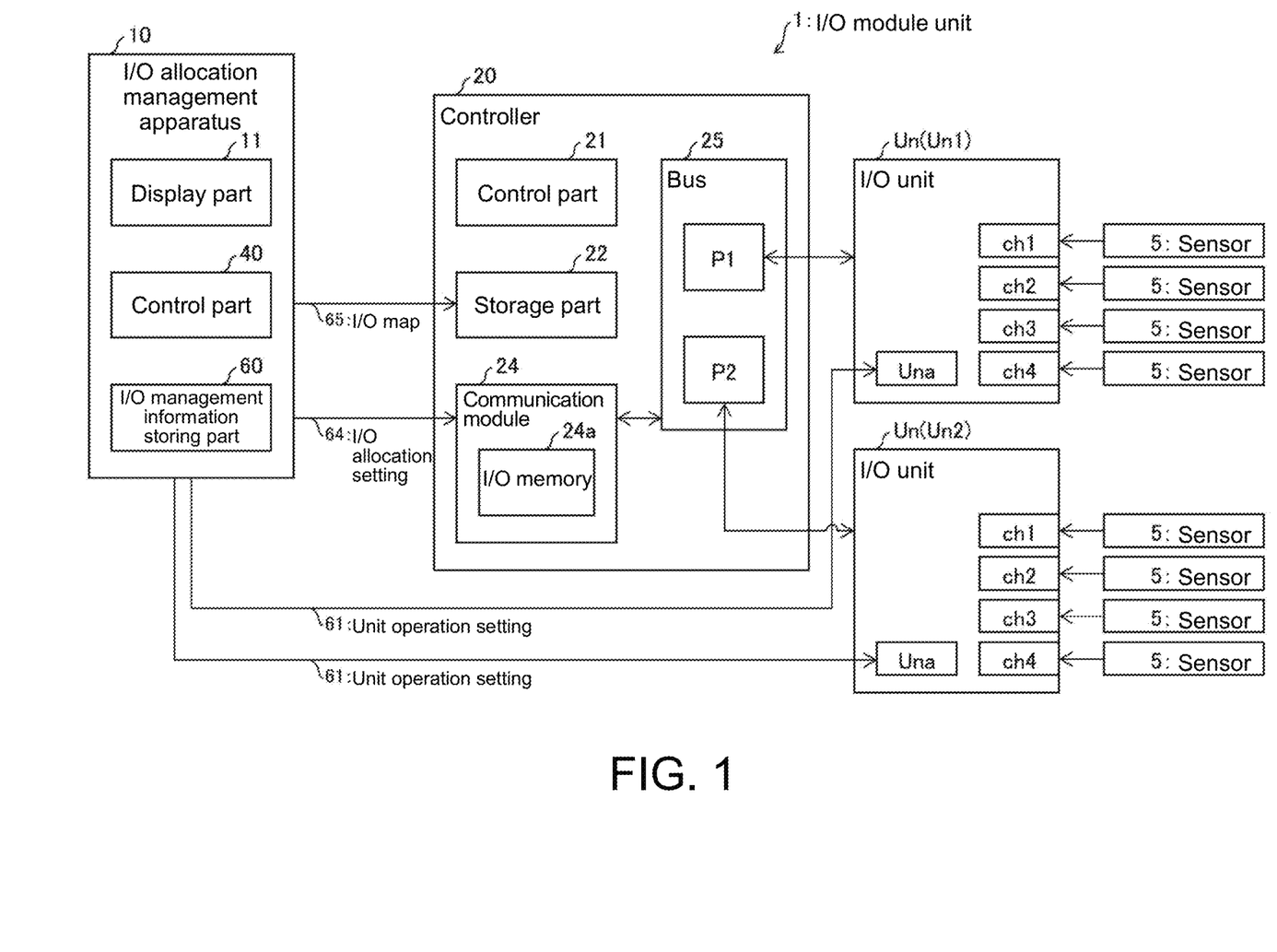
FIG. 1 is a block diagram showing a configuration of an I/O module unit of embodiment 1.
Figure 2:
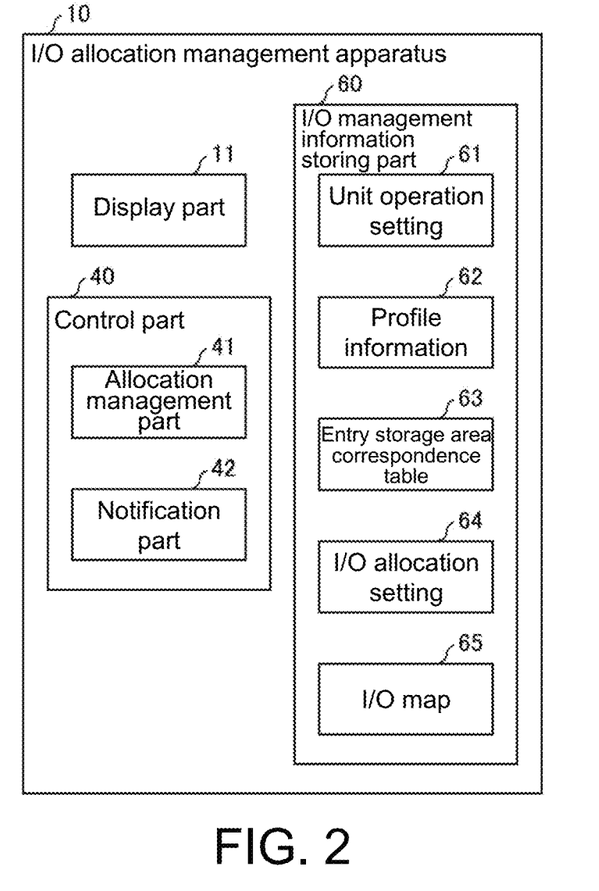
FIG. 2 is a block diagram showing a configuration of an I/O allocation management apparatus of embodiment 1.

With reference to FIG. 1 and FIG. 2, an example of scenes in which the invention is applied is described. FIG. 1 is a block diagram showing a configuration of an I/O module unit 1 of embodiment 1. FIG. 2 is a block diagram showing a configuration of an I/O allocation management apparatus 10 of embodiment 1.

The I/O allocation management apparatus 10 shown in FIG. 1 and FIG. 2 is an apparatus in which an I/O unit acquires input data from various input devices (various sensors and the like) arranged on a control object apparatus used in a factory and the like and an allocation state of a position of a storage area which is a transfer destination of the acquired input data is managed.

For example, a high-function I/O module such as a high-speed analog input unit and an IO-Link master and the like requires a size change of I/O required for control according to a sampling number of analog input and a setting (a unit operation setting) of process data size of a device connected to the IO-Link master.

So far, the user needs to manually change an I/O allocation setting according to editing content of the unit operation setting. However, a correlation between the two settings is not instinctive so that the user needs to perform trial and error, or perform the I/O allocation setting while checking a manual.

Therefore, in the I/O allocation management apparatus 10 shown in FIG. 1 and FIG. 2, the optimal I/O allocation setting is automatically generated from content of the unit operation setting. In this way, an operation is unnecessary in which the user manually sets the complicated I/O allocation setting based on the unit operation setting of the I/O unit, and the stop and non-operation of a system caused by an inconsistence in setting can be eliminated. As a result, a start-up time of a manufacturing equipment system can be shortened.

In addition, in the I/O allocation management apparatus 10 shown in FIG. 1 and FIG. 2, from the content of the unit operation setting, the I/O allocation setting may be selectively (that is, semi-automatically) generated by the user within a range that the I/O unit is not abnormal. In this way, presence or absence of the ineffective I/O allocation setting with respect to an input-output channel (port) of the I/O unit can be selectively set, and a system with scalability can be developed.

§ 2 Configuration Example

Embodiment 1

As shown in FIG. 1, the I/O module unit 1 includes the I/O allocation management apparatus (I/O management apparatus) 10, a controller 20, and an I/O unit Un.

The I/O allocation management apparatus 10 includes a display part 11, a control part 40, and an I/O management information storing part 60. The I/O allocation management apparatus 10 manages an I/O (input-output) of the input data for the I/O unit Un connected with input devices such as sensors 5 and for the controller 20 controlling the I/O unit Un. For example, the I/O allocation management apparatus 10 manages a plurality of I/O units Un connected to the controller 20.

The I/O units Un is connected to each of a plurality of sensors (input devices) 5 arranged on the control object apparatus (a robot and the like). The I/O unit Un is an apparatus which acquires the input data indicating various information from each sensor 5 connected to the I/O unit Un or outputs a control signal for controlling the drive of various actuators arranged on the control object apparatus.

The I/O unit Un includes a storage part Una for storing various information and channels ch1-ch4 which are connection terminals for connecting the sensors 5. The I/O unit Un transfers the input data acquired form the sensors 5 to the controller 20 in each of the channels ch1-ch4 based on the content of a unit operation setting 61 (specifically described below) which is sent from the I/O allocation management apparatus 10 and stored in the storage part Una.

In FIG. 1, as an example, the I/O module unit 1 is shown to include an I/O unit Un1 and an I/O unit Un2 as I/O units Un, but the number of I/O module included in the I/O module unit 1 is not limited to two, and may be one or plural.

The controller 20 includes a control part 21, a storage part 22, a communication module 24, and a bus 25. The control part 21 collectively controls the operations of the controller 20. The storage part 22 stores an I/O map 65 transmitted from the I/O allocation management apparatus 10. The bus 25 has a plurality of ports which are input terminals of the I/O unit Un. For example, a plurality of robots or manufacturing line driving apparatuses are connected to the controller 20. The controller 20 may control the plurality of robots or driving apparatuses with reference to the input data from each sensor 5 indicating various information and according to a program set by the user.

In the example in FIG. 1, the bus 25 is illustrated to include a port P1 to which the I/O unit Un1 is connected and a port P2 to which the I/O unit Un2 is connected, but the number of ports arranged in the bus 25 may also be one or more than three.

The communication module 24 controls communication with each I/O unit Un connected to each port of the bus 25. The communication module 24 includes an I/O memory 24a.

The I/O memory 24a is a storage part of the transfer destination to which the input data is transferred by the I/O unit Un through the port of the bus 25. The I/O memory 24a includes a plurality of storage areas. Besides, an entry (specification information) which is a variable number for specifying the position of the storage area is allocated to each storage area, and is stored in the I/O management information storing part 60 as an entry storage area correspondence table 63 (see FIG. 5).

As shown in FIG. 2, the control part 40 includes an allocation management part 41 and a notification part 42. The I/O management information storing part 60 stores the unit operation setting 61, profile information 62, the entry storage area correspondence table 63, the I/O allocation setting 64, and the I/O map 65.

The display part 11 is a display which displays various input screens that facilitates the input of the user. The input screens displayed by the display part 11 are, for example, a setting screen 12A (FIG. 9), a warning screen 12B (FIG. 10), a detail warning screen 12Ba (FIG. 11), an I/O allocation situation screen 12C before mismatch elimination (FIG. 12), and an I/O allocation situation screen 12C after mismatch elimination (FIG. 13) and the like, which are described below.

The allocation management part 41 judges whether the mismatch occurs in the allocation state between the storage capacity required for the storage of the input data which is acquired from the sensors 5 and transferred to the controller 20 by the I/O unit Un, and the storage capacity of the storage area in the I/O memory 24a which is allocated as the transfer destination of the input data, and performs mismatch elimination sometimes.

When the allocation management part 41 judges that the mismatch occurs in the allocation state, the notification part 42 notifies the user of the mismatch occurring in the allocation state. In this way, the user can easily recognize that the mismatch occurs in the allocation state.

Figure 3:
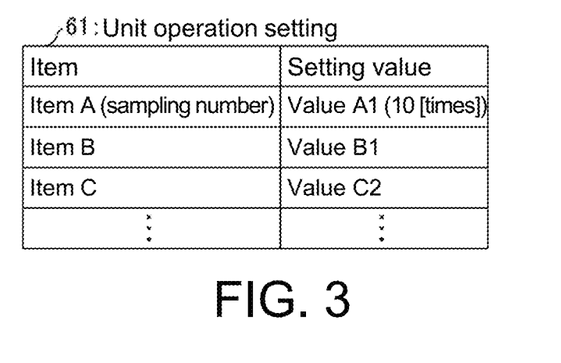
FIG. 3 is a drawing showing a unit operation setting stored in a storage part of an I/O unit.

FIG. 3 is a diagram showing the unit operation setting 61 stored in the storage part Una of the I/O unit Un. The unit operation setting 61 is data describing operations of the I/O unit Un.

The unit operation setting 61 indicates a relation between items (parameters) of the input data acquired and transferred from the input devices such as the sensors 5 or the like by the I/O unit Un and setting values related to the items of the input data.

In FIG. 3, the unit operation setting 61 is illustrated as a table in which the setting value is associated with each item of the input data, but the form of the unit operation setting 61 is not limited to the table. The item of the input data can include, for example, sampling times (acquisition times of data) of the analog data acquired by the sensors 5 and the like, a sampling interval, and a size of the data acquired from the input devices such as the sensors 5 and the like.

The unit operation setting 61 is created by the user based on the profile information 62 (FIG. 4) stored in the I/O management information storing part 60 of the I/O allocation management apparatus 10. The unit operation setting 61 created in the I/O allocation management apparatus 10 is stored in the I/O management information storing part 60 and is transferred from the I/O allocation management apparatus 10 to each I/O unit Un. Then, the unit operation setting 61 transferred to the I/O unit Un is stored in the storage part Una of each I/O unit Un.

The I/O unit Un acquires the input data from the sensors 5 and transfers the acquired input data to the controller 20 based on the setting value set for each of the items set in the unit operation setting 61.

Figure 4:
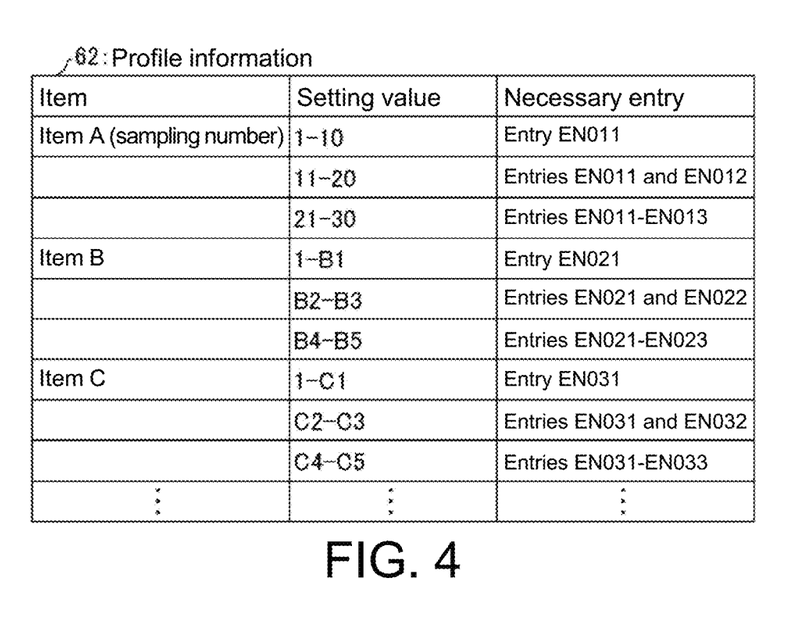
FIG. 4 is a drawing showing profile information stored in the storage part of the I/O allocation management apparatus.

FIG. 4 is a diagram showing the profile information 62 stored in the storage part of the I/O allocation management apparatus 10. The profile information 62 indicates, when the setting value of the unit operation setting 61 (FIG. 3) is changed, an allocation relation between the changed setting value and a storage area (a storage area in the I/O memory 24a) required for the storage of the input data of the I/O unit Un based on the changed setting value. As an example, the profile information 62 is a static file which describes identification information or characteristics and the like of the I/O unit Un (a type and a size of I/O). Items and values (type and range) which can be set for the I/O unit Un may be included.

In the example shown in FIG. 4, in the profile information 62, a range of the setting value of each item is associated with an entry required for allocation in each range of the setting value.

Figure 5:
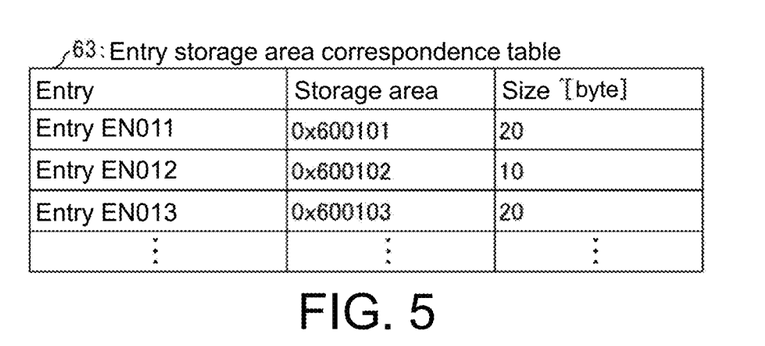
FIG. 5 is a drawing showing an entry-storage area correspondence table stored in the storage part of the I/O allocation management apparatus.

FIG. 5 is a diagram showing the entry storage area correspondence table 63 stored in the storage part of the I/O allocation management apparatus 10. In the entry storage area correspondence table 63, the entry, the position of the storage area in the I/O memory 24a and the storage capacity (size) which can be stored in the storage area are associated. As shown in FIG. 5, the entry storage area correspondence table 63 may be a table or other data forms.

Figure 6:
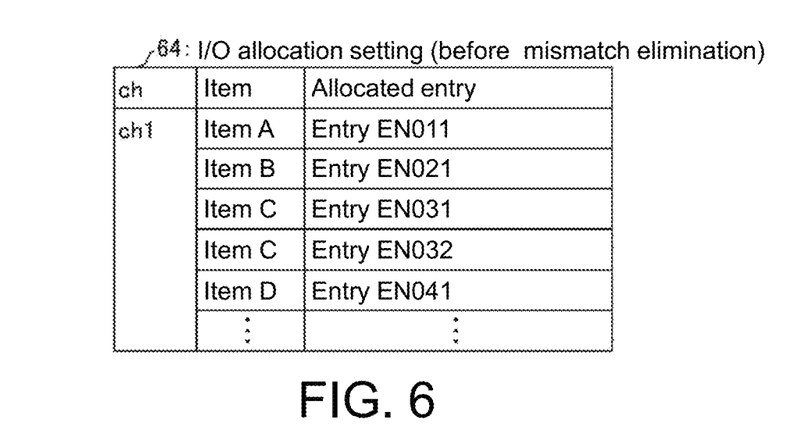
FIG. 6 is a diagram showing an I/O allocation setting before edition stored in a communication module of a controller.

FIG. 6 is a diagram showing the I/O allocation setting 64 before mismatch elimination and stored in the communication module 24 of the controller 20.

The I/O allocation setting 64 is data indicating a relation between the input data transferred from the sensors 5 to the I/O unit Un and the entry which is a variable number that specifies the storage area, wherein the storage area is within a plurality of storage areas included in the I/O memory 24a of the transfer destination to which the input data is transferred by the I/O unit Un and is allocated as the transfer destination of the input data.

The I/O allocation setting 64 is created by the user using the I/O allocation management apparatus 10. The I/O allocation setting 64 created by the I/O allocation management apparatus 10 is stored in the I/O management information storing part 60, and is transferred from the I/O allocation management apparatus 10 to the communication module 24 of the controller 20.

Furthermore, in FIG. 6, a state is shown that the mismatch occurs in the allocation state between the input data and the storage area.

Figure 7:
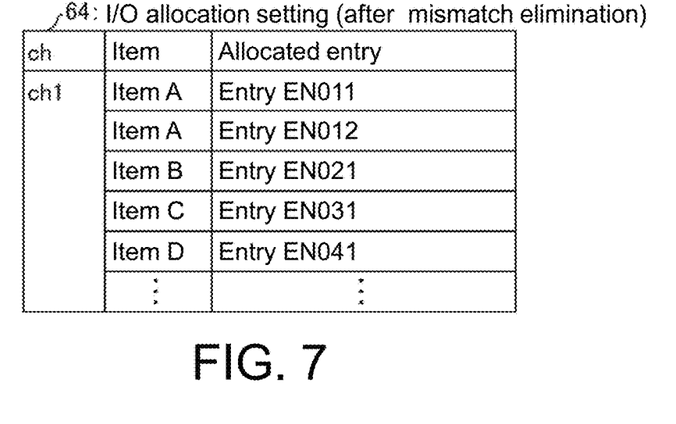
FIG. 7 is a diagram showing an I/O allocation setting after edition stored in the communication module of the controller.

FIG. 7 is a diagram showing the I/O allocation setting 64 after mismatch elimination and stored in the communication module 24 of the controller 20. In FIG. 7, an I/O allocation setting 64b is shown which shows a state that the mismatch occurring in the allocation state between the input data and the storage area is eliminated.

The mismatch of the allocation state and the mismatch elimination shown in FIG. 6 and FIG. 7 are described below.

Figure 8:
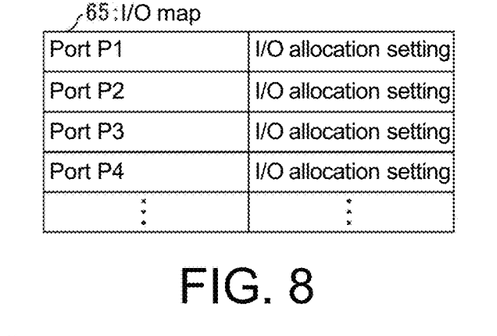
FIG. 8 is a diagram showing an I/O map stored in the storage part of the controller.

FIG. 8 is a diagram showing the I/O map 65 stored in the storage part 22 of the controller 20. The I/O map 65 is data which describes a position of the storage area of the I/O memory 24a of the communication module 24 allocated to the storage part 22 (a CPU memory and the like) of the controller 20 and so on. The I/O map 65 is data which is created from the I/O allocation setting 64 and in which the I/O allocation setting 64 (FIG. 6 and FIG. 7) created for each port is described. The I/O map 65 created by the I/O allocation management apparatus 10 is stored in the I/O management information storing part 60, and is also transferred to and stored in the storage part 22 of the controller 20.

Figure 9:
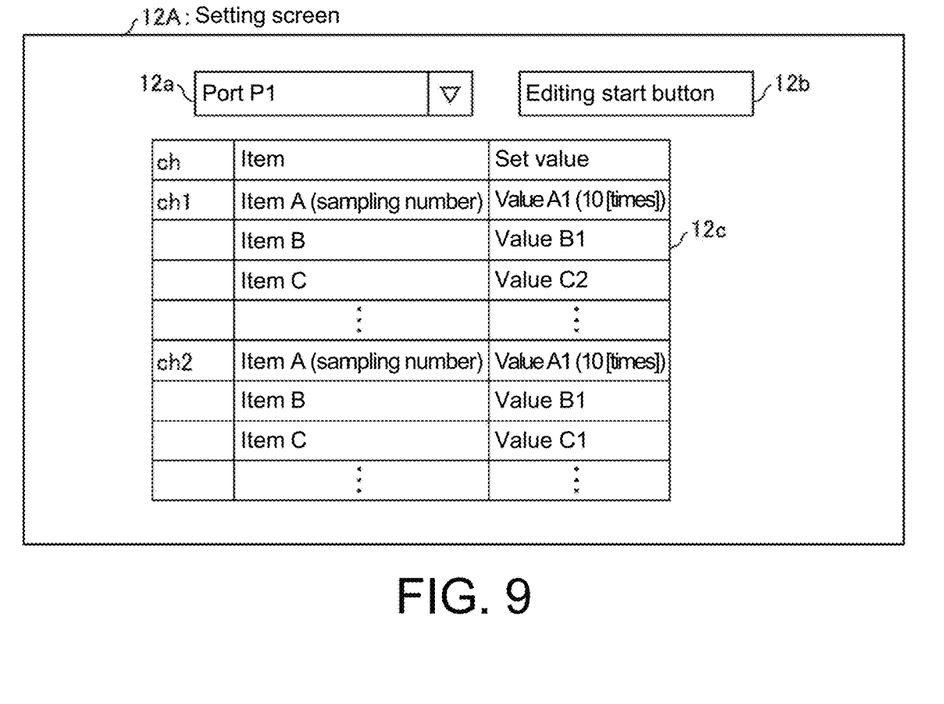
FIG. 9 is a diagram showing a setting screen displayed on a display part of the I/O allocation management apparatus.
Figure 10:
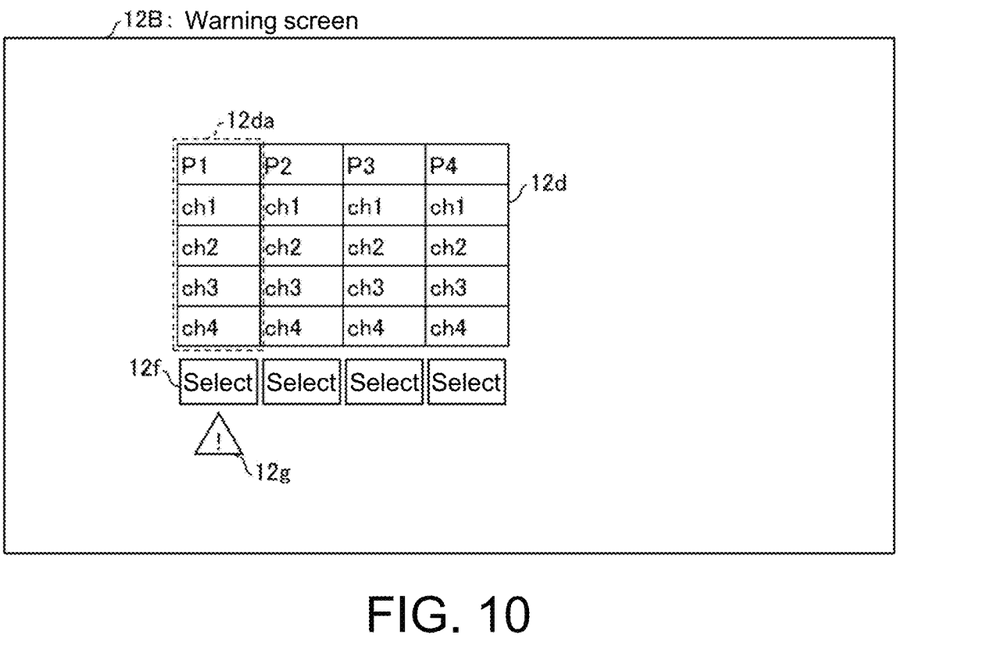
FIG. 10 is a diagram showing a warning screen displayed on the display part of the I/O allocation management apparatus.
Figure 11:
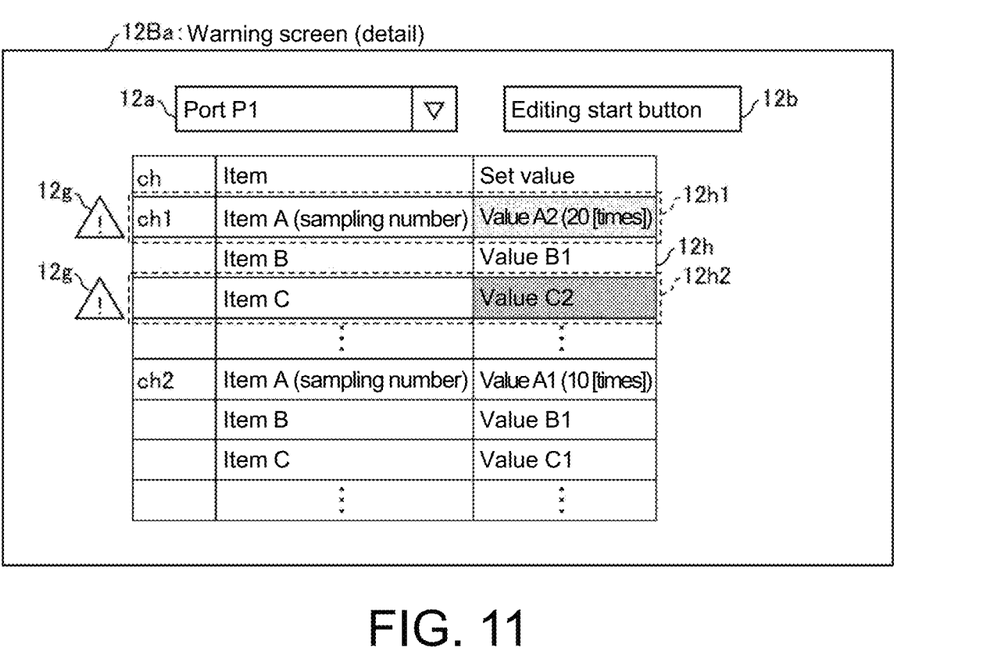
FIG. 11 is a diagram showing a specific warning screen displayed on the display part of the I/O allocation management apparatus.
Figure 12:
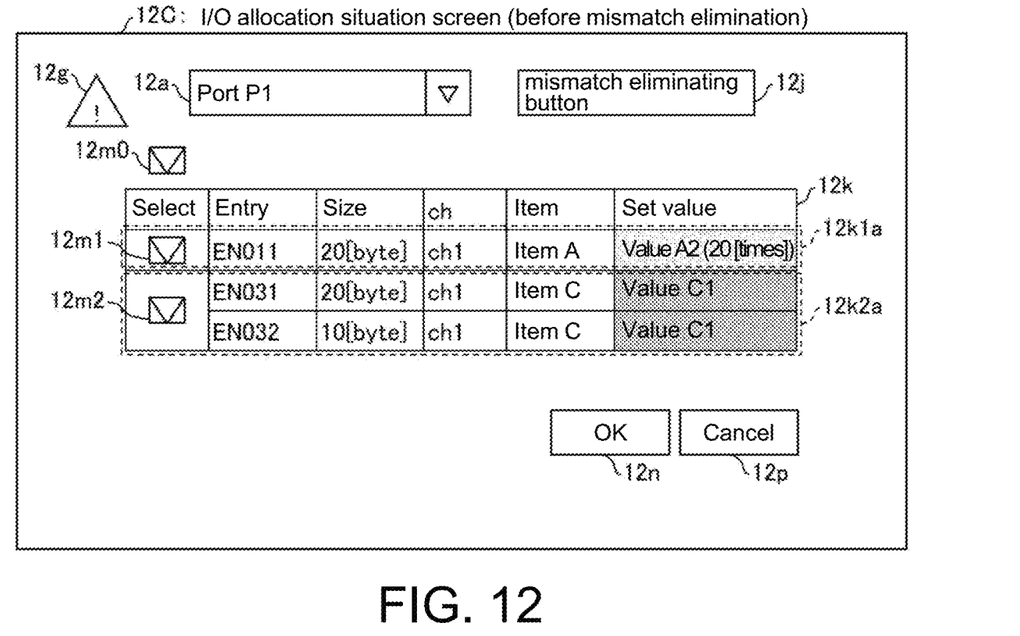
FIG. 12 is a diagram showing an I/O allocation situation screen before problem elimination displayed on the display part of the I/O allocation management apparatus.
Figure 13:
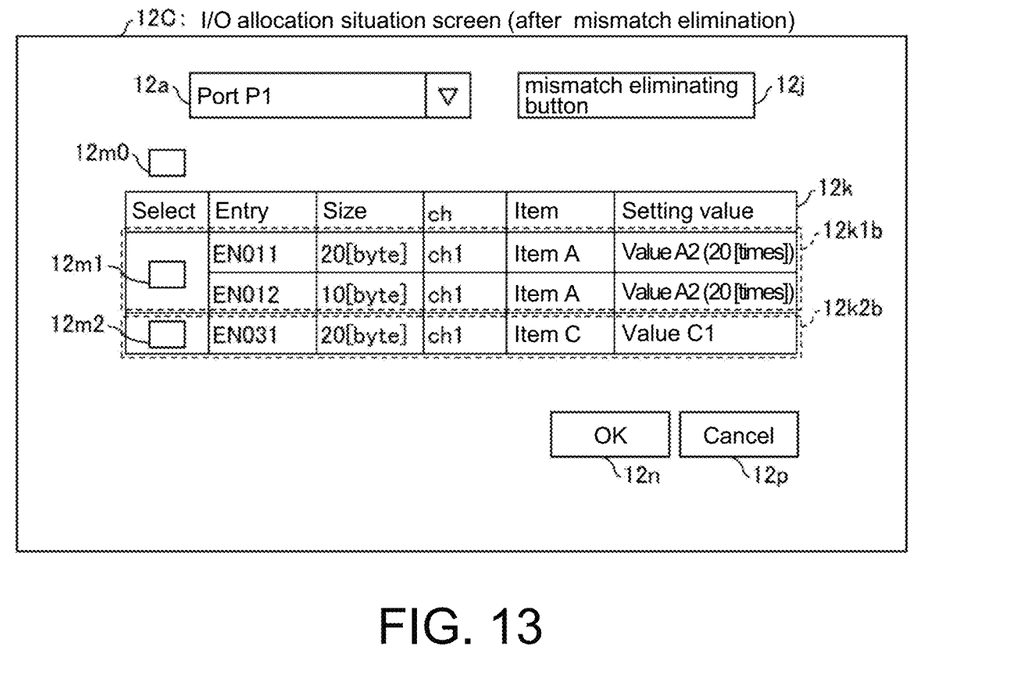
FIG. 13 is a diagram showing an I/O allocation situation screen after problem elimination displayed on the display part of the I/O allocation management apparatus.
Figure 14:
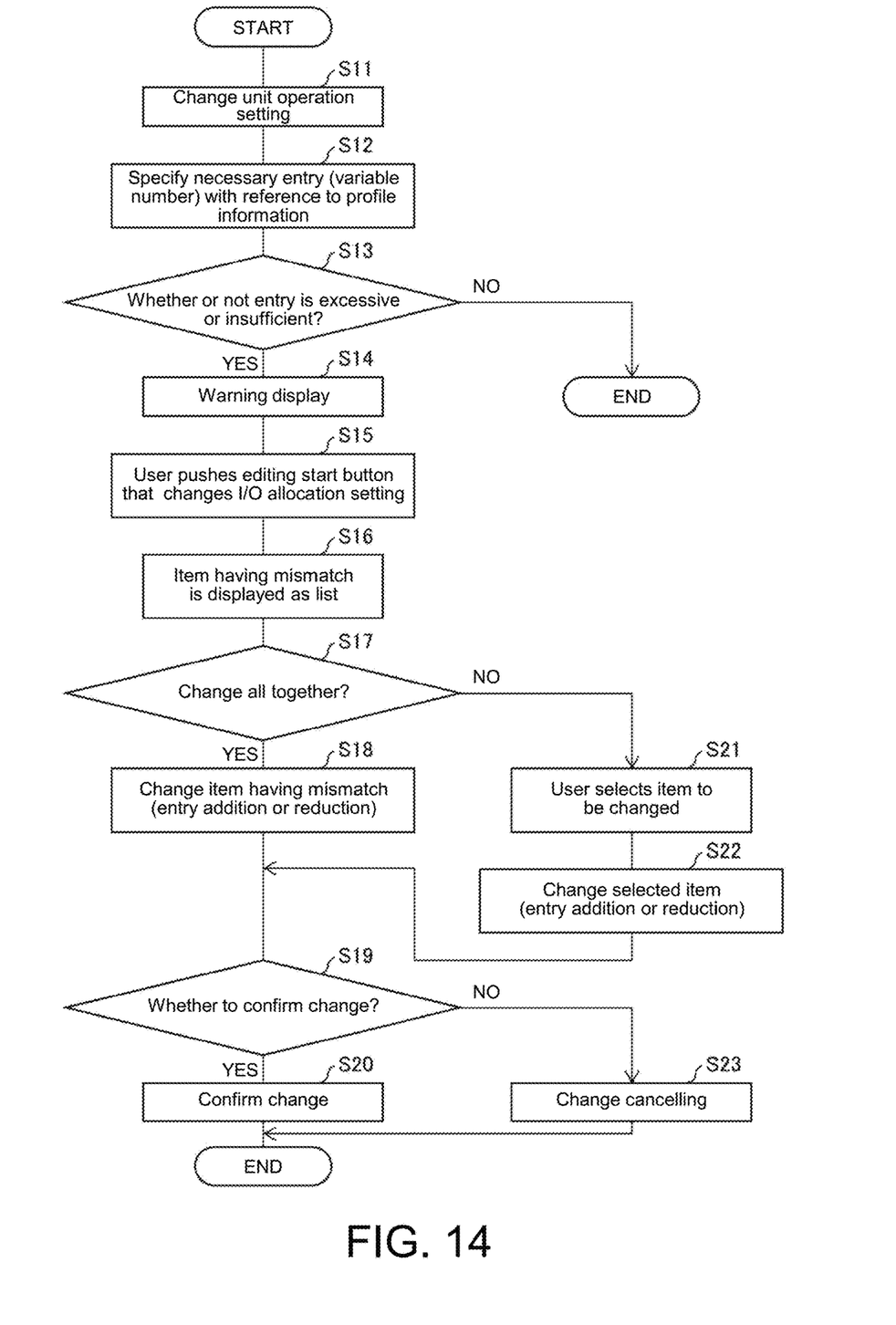
FIG. 14 is a flow chart showing a processing flow of the I/O allocation management apparatus of embodiment 1.

FIG. 9 is a diagram showing the setting screen 12A displayed on the display part 11 of the I/O allocation management apparatus 10. FIG. 10 is a diagram showing the warning screen 12B displayed on the display part 11 of the I/O allocation management apparatus 10. FIG. 11 is a diagram showing the detail warning screen 12Ba displayed on the display part 11 of the I/O allocation management apparatus 10. FIG. 12 is a diagram showing the I/O allocation situation screen 12C before the elimination of problems and displayed on the display part 11 of the I/O allocation management apparatus 10. FIG. 13 is a diagram showing the I/O allocation situation screen 12C after the elimination of problems and displayed on the display part 11 of the I/O allocation management apparatus 10. FIG. 14 is a flow chart showing a processing flow of the I/O allocation management apparatus 10 of embodiment 1.

Next, operations of the I/O module unit 1 are described based mainly on the flow chart of FIG. 14 and various input screens shown in FIG. 9-FIG. 13. Furthermore, an example of the input screens displayed by the display part 11 is shown in FIG. 9-FIG. 13. However, the input screens displayed by the display part 11 are not limited to the configurations shown in FIG. 9-FIG. 13.

The setting screen 12A shown in FIG. 9 is an input screen which receives an input operation of the user for changing the operation setting of the I/O unit Un. The setting screen 12 mainly displays content set by the unit operation setting 61.

The allocation management part 41 displays the setting screen 12A in the display part 11 with reference to the unit operation setting 61 stored in the I/O management information storing part 60. For example, in the example shown in FIG. 9, a port selecting button 12a, an editing start button 12b, and a unit operation setting table 12c are displayed on the setting screen 12A.

On the setting screen 12A, for example, a table 12c is displayed in which a corresponding relation between the present items and the setting values is described for each channel. In the setting screen 12A, a setting situation of the port selected by the user in the port selection button 12a is displayed in the table 12c.

As shown in FIG. 9 and FIG. 14, when the user changes the unit operation setting 61, according to an instruction from the user, the allocation management part 41 displays the setting screen 12A on the display part 11 with reference to the unit operation setting 61 stored in the I/O management information storing part 60.

If the user changes the setting value in the setting screen 12A, the allocation management part 41 changes the setting value of the unit operation setting 61 corresponding to the change (step S11). For example, by the user, the setting value of item A (sampling number) in the port P1 and the channel ch1 is changed from a value A1 (10 times) to a value A2 (20 times) and the setting value of item C is changed from a value C2 to a value C1.

Next, the allocation management part 41 specifies an entry (a variable number) required for the storage of the input data based on the changed setting value with reference to the profile information 62 (FIG. 4) stored in the I/O management information storing part 60 (step S12).

For example, with reference to the profile information 62, the allocation management part 41 specifies that an entry required for the storage of the input data based on a value 20 which is the setting value after being change of the item A (sampling number) in the channel ch1 is entries EN011 and EN012, and specifies that an entry required for the storage of the input data based on the value C1 which is the setting value after being changed of the item C in the channel ch1 is an entry EN031.

When the necessary entry is specified, from the entry storage area correspondence table 63 (FIG. 5), the position of the storage area within a plurality of storage areas in the I/O memory 24a and corresponding to the entry and the storage capacity (size) of the storage area are specified.

Next, with reference to the I/O allocation setting 64a (FIG. 6), the allocation management part 41 compares input data and the entry allocated to the input data specified in the I/O allocation setting 64a with an entry required for the storage of the input data based on the changed setting value and specified in step S12, and judges whether the presently allocated entry is excessive or insufficient (step S13).

In this way, the allocation management part 41 judges whether the mismatch occurs in the allocation state between the input data and the storage area. Furthermore, the occurrence of mismatch refers to a state that the storage capacity of the storage area specified in the I/O allocation setting 64 (in other words, the number of the allocated entry) is insufficient or excessive with respect to the storage capacity required for the storage of the input data based on the changed setting value.

In this way, if the setting value of the unit operation setting 61 is changed, the allocation management part 41 judges whether the mismatch occurs in the allocation state between the input data allocated before the change of the setting value and the storage area in the I/O memory 24a. Accordingly, when the mismatch of the allocation state occurs, by informing the user of the judgment result, the user can easily recognize an occurrence of the mismatch of the allocation state. Therefore, an occurrence of the mismatch between the storage capacity of the input data generated along with the change of the setting value and the storage capacity of the presently allocated storage area can be prevented from being overlooked. As a result, the problems can be prevented that the controller 20 cannot acquire a correct value and operates incorrectly or a robot operates incorrectly or the like due to leaving out a mismatch that requires a change.

In addition, with reference to the profile information 62 (FIG. 4), even if the setting value is changed, the allocation management part 41 can specify the storage capacity required for the storage of the input data based on the changed setting value.

For example, in step S13, with reference to the I/O allocation setting 64a (FIG. 6), the allocation management part 41 judges that because only the entry EN011 is presently allocated to the item A in the channel ch1, the necessary entry is insufficient (the mismatch occurs) with respect to the entries EN011 and EN012 required for the storage of the input data based on the changed setting value of the item A specified in step S12 ("YES" in step S13).

In addition, in step S13, with reference to the I/O allocation setting 64a (FIG. 6), the allocation management part 41 judges that because the entries EN031 and EN032 are presently allocated to the item C in the channel ch1, the necessary entry is excessive (the mismatch occurs) with respect to the entry EN031 required for the storage of the input data based on the changed setting value of the item C in step S12 ("YES" in step S13).

Furthermore, in step S13, if the allocation management part 41 judges that the present allocated entry is not excessive or insufficient (that is, the mismatch does not occur) ("NO" in step S13), the flow is completed.

When the allocation management part 41 judges that the present allocated entry is excessive or insufficient (that is, the mismatch occurs) in step S13 ("YES" in step S13), the warning screen 12B including warning information 12g which is notification information notified by the notification part 42 is displayed on the display part 11 (step S14).

As shown in FIG. 10, on the warning screen 12B, for example, channel information 12d of each port indicating the channel arranged in each port, selection buttons 12f arranged in each port, and warning information 12g associated with the port within the plurality of ports and in which the mismatch occurs are displayed.

In the example shown in FIG. 10, as the channel information 12d of each port, the information is displayed that the channels ch1-ch4 which receive input of signals are respectively arranged on the ports P1-P4. Besides, the warning information 12g is displayed associated with channel information 12da of the port P1 in the channel information 12d of each port. Accordingly, the user can easily specify which is the I/O unit Un within a plurality of I/O units Un connected to the controller 20 to which the mismatch occurs in the allocation state.

If the selection button 12f for selecting the port P1 in which the warning information 12g is displayed correspondingly is selected by the user, the allocation management part 41 displays the detail warning screen 12Ba related to the port P1 on the display part 11.

As shown in FIG. 11, the specific information of port P1 and the warning information 12g associated with the item in which the mismatch occurs are displayed on the detail warning screen 12Ba. In the example shown in FIG. 11, the item and setting value (the changed setting value when the setting value is changed in step S11) of each channel in the port P1 and the warning information 12g respectively corresponding to the items A and C of the channel ch1 in which the mismatch occurs are displayed.

Next, as shown in FIG. 11 and FIG. 14, the user pushes (selects) the editing start button 12b that changes the I/O allocation setting in order to eliminate the mismatch (step S15).

Then, the allocation management part 41 displays the item in which the mismatch occurs is displayed as a list on the display part 11 (step S16).

In the example shown in FIG. 12, on the I/O allocation situation screen 12C displayed in the display part 11 by the allocation management part 41, the items A and C in which the mismatch occurs are displayed as a list in a table 12k. In the table 12k, the items A and C in which the mismatch occurs and information of each item such as the setting value (the changed setting value), the allocated entry, and the storage capacity (size) of the storage area specified according to the entry are displayed.

Then, as shown in FIG. 12 and FIG. 14, the allocation management part 41 judges whether to change all items having the mismatch on the I/O allocation situation screen 12C together (to eliminate the mismatch) (step S17).

In the example shown in FIG. 12, a checkbox 12m1 for selecting the item A is displayed corresponding to the item A; a checkbox 12m2 for selecting the item C is displayed corresponding to the item C; and a checkbox 12m0 for switching a selected state and a-non-selected state of the checkboxes 12m1 and 12m2 together is displayed outside the table 12k.

Then, when all the checkboxes (the checkboxes 12m1 and 12m2 in the example of FIG. 12) corresponding to each item are selected by the user selecting the checkbox 12m0 and a mismatch eliminating button 12j is selected, the allocation management part 41 judges that all items having the mismatch on the I/O allocation situation screen 12C are to be changed (to eliminate the mismatch) together ("YES" in step S17).

As shown in FIG. 13 and FIG. 14, if the allocation management part 41 judges that all items having the mismatch on the I/O allocation situation screen 12C are to be changed (to eliminate the mismatch) together ("YES" in step S17), the mismatch of the item in which the mismatch occurs is eliminated (step S18), and an I/O allocation situation screen 12Cb on which the mismatch is eliminated is displayed on the display part 11.

As shown in FIG. 13, for example, the allocation management part 41 adds the entry allocated to the item A by allocating the entry EN011 and the entry EN012 to the item A in which the value A2 is set as the setting value, and reduces the number of the entry allocated to the item C by only allocating the entry EN031 to the item C in which the value C1 is set as the setting value.

Next, the allocation management part 41 judges whether to confirm the changed allocation state based on the input from the user (step S19).

For example, if an OK button 12n in FIG. 13 is selected by the user, the allocation management part 41 judges that the changed allocation state is to be confirmed ("YES" in step S19).

Then, as shown in FIG. 7, the allocation management part 41 reflects the changed allocation state (the correspondence relation between the item and the allocated entry) on the I/O allocation setting 64 stored in the I/O management information storing part 60, creates and saves the I/O allocation setting 64 after the mismatch is eliminated. In the I/O allocation setting 64 before mismatch elimination shown in FIG. 6, the entry EN011 is allocated to the item A and the entries EN031 and EN032 are allocated to the item C. In the I/O allocation setting 64 after mismatch elimination shown in FIG. 7, the number of the entry allocated to the item A increases and the entries EN011 and EN012 are allocated, and the number of the entry allocated to the item C decreases and the entry EN031 is allocated.

Accordingly, the allocation management part 41 confirms the changed allocation state (step S20), and transmits the I/O allocation setting 64 after mismatch elimination to the communication module 24. Furthermore, the allocation management part 41 updates the I/O map 65 based on the I/O allocation setting 64 after mismatch elimination, stores the updated I/O map 65 in the I/O management information storing part 60 and transmits the updated I/O map 65 to the storage part 22 of the controller 20.

The flow is finished in this way.

When the allocation management part 41 judges that the change of the changed allocation state is to be cancelled ("NO" in step S19) because a cancel button 12p in FIG. 13 is selected by the user and so on in step S19, the allocation management part 41 cancels the change of the allocation state (step S23) and finishes the flow. That is, instead of reflecting the allocation state between the items and entries displayed in the I/O allocation situation screen 12C of FIG. 13 on the I/O allocation setting 64, the allocation management part 41 maintains the state of the I/O allocation setting 64 shown in FIG. 6 and finishes the flow.

In addition, in step S17, if any one of the checkboxes 12m1 and 12m2 shown in FIG. 12 is selected and the mismatch eliminating button 12j is selected, the allocation management part 41 judges that not all the items having the mismatch on the I/O allocation situation screen 12C are to be changed together (not to eliminate the mismatches together) ("NO" in step S17). Then, the allocation management part 41 only changes the allocation state of the item selected in step S17 (step S22), and the I/O allocation situation screen 12C shown in FIG. 13 is displayed on the display part 11.

Then, after that, the flow proceeds to "YES" in step S19 and the processing of step S20, or "NO" in step S19 and the processing of step S23.

In this way, in step S19, the allocation management part 41 informs the user of the changed allocation state between the input data and the storage area before confirming the change of the allocation state between the input data and the storage area specified in the I/O allocation setting 64 (FIG. 6), and facilitates the user to determine whether the allocation state is to be changed in the input. In this way, the allocation state unintended by the user can be prevented.

In addition, in step S13, if the allocation management part 41 judges that the mismatch of the allocation state occurs, the allocation state between the input data and the storage area specified in the I/O allocation setting 64 is changed and the change is confirmed in step S20 so that the storage capacity required for the storage of the input data based on the changed setting value is ensured.

Therefore, by the allocation management part 41 instead of the user, the allocation state between the input data and the storage area specified in the I/O allocation setting 64 is changed so that the storage capacity required for the storage of the input data based on the changed setting value is ensured. Accordingly, the trouble of the user changing the allocation state between the input data and the storage area is avoided; furthermore, a change miss of the allocation state caused by the user can be prevented. Accordingly, unintentional stop of the operation of the I/O unit can be more reliably prevented.

Here, for example, in a case that the storage capacity (that is, the number of entry) specified in the I/O allocation setting 64 is insufficient with respect to the storage capacity required for the storage of the input data based on the changed setting value, such as the case in FIG. 12 that only the entry EN011 is allocated to the item A in which the value A2 is set as the setting value, the input data cannot be transferred from the I/O unit Un to the controller 20, and thus the elimination of mismatch of the allocation state is required.

On the other hand, in a case that the storage capacity specified in the I/O allocation setting 64 is excessive with respect to the storage capacity required for the storage of the input data based on the changed setting value, such as the case in FIG. 12 that the entry EN031 and the entry EN32 are allocated to the item C in which the value C1 is set as the setting value, the input data can be transferred from the I/O unit Un to the controller 20, and thus whether to eliminate the mismatch of the allocation state is optionally set by the user.

Therefore, when the allocation management part 41 judges that the mismatch occurs in the allocation state, the information indicating whether the elimination of mismatch of the allocation state is required or optional may be displayed in the display part 11.

For example, by the allocation management part 41, on the I/O allocation situation screen 12C shown in FIG. 12, the checkbox 12m1 corresponding to the item A may be displayed forcibly as the selected state so as not to be released of selection by the user; on the other hand, the checkbox 12m2 corresponding to the item C may be displayed so as to be optionally selected by the user whether to become the selected state or the non-selected state.

Accordingly, for example, when viewing the I/O allocation situation screen 12C shown in FIG. 12, the user can determine whether the elimination of mismatch of the allocation state is required or optional. In this way, only the minimum necessary elimination of mismatch is performed and thus the trouble of the user can be reduced.

Furthermore, in the I/O module unit 1, the controller 20 may also be connected to the I/O unit Un via a communication coupler. For example, the communication coupler is connected to the controller 20 via a network, and the I/O unit Un is connected to the communication coupler. The input data to the I/O unit Un is transmitted to the communication coupler and is transmitted from the communication coupler to the controller 20. In this case, the I/O memory 24a may be arranged not on the controller 20 but on the communication coupler. The I/O allocation setting is stored in the communication coupler.

[Implementation Using Software]

A control block (especially the allocation management part 41 and the notification part 42) of the I/O allocation management apparatus 10 may be implemented by a logic circuit (hardware) formed in an integrated circuit (IC chip) and the like, or may be implemented by software.

In the latter case, the I/O allocation management apparatus 10 is provided with a computer that executes commands of a program which is software for realizing each function. The computer includes, for example, one or more processors and a computer readable recording medium in which the above program is stored. Then, the processor reads the program from the recording medium and executing the program in the computer, thereby achieving the purpose of the disclosure. As the processor, for example, a CPU (Central Processing Unit) can be used. As the above recording medium, a "non-transitory tangible media", for example, besides a ROM (Read Only Storage) and the like, a tape, a disk, a card, a semiconductor memory, a programmable logic circuit and the like can be used. In addition, a RAM (Random Access Storage) and the like for decompressing the program may be further provided. In addition, the program may be supplied to the computer via an optional transmission medium (a communication network or a broadcast wave or the like) capable of transmitting the program. Furthermore, one aspect of the disclosure can also be implemented in a form of a data signal which is embedded in a carrier wave and in which the program is embodied by an electronic transmission.

[Other Configurations]

In view of above, an I/O management apparatus which manages an I/O unit to which input devices are connected and a controller which controls the IO unit. The I/O management apparatus includes an I/O management information storing part and an allocation management part. The I/O management information storing part stores a unit operation setting, indicating a relation between input data that is acquired and transferred from the input device by the I/O unit and a setting value related to the input data; and an I/O allocation setting, indicating a relation between the input data and specification information that specifies a storage area, wherein the storage area is within a plurality of storage areas included in a storage part of a transfer destination to which the input data is transferred by the I/O unit and is allocated as the transfer destination of the input data. The allocation management part judges, when the setting value is changed in the unit operation setting, whether a mismatch occurs in an allocation state between the input data and the storage area specified in the I/O allocation setting by specifying a storage capacity required for a storage of the input data based on the changed setting value.

According to the above configuration, when the setting value is changed, the allocation management part judges whether the mismatch occurs in the allocation state between the input data and the storage area allocated before the change of the setting value. In this way, when the mismatch of the allocation state occurs, by informing the user of the judgment result, the user can easily recognize an occurrence of the mismatch of the allocation state. Therefore, the occurrence of the mismatch between the storage capacity of the input data generated along with the change of the setting value and the storage capacity of the presently allocated storage area can be prevented from being overlooked. As a result, the problems can be prevented that the controller fails to acquire a correct value and operates incorrectly or a robot operates incorrectly or the like due to leaving out a mismatch that requires a change.

In addition, when the setting value is changed in the unit operation setting, the allocation management part may specify the storage capacity required for the storage of the input data based on the changed setting value by referring to profile information that indicates an allocation relation between the changed setting value and the storage area required for the storage of the input data based on the changed setting value.

According to the above configuration, by referring to the profile information, the allocation management part can specify the storage capacity required for the storage of the input data based on the changed setting value even when the setting value is changed.

In addition, when the allocation management part judges that the mismatch of the allocation state occurs, the allocation state between the input data and the storage area specified in the I/O allocation setting may be changed and the change may be confirmed so that the storage capacity required for the storage of the input data based on the changed setting value is ensured.

According to the above configuration, the allocation state between the input data and the storage area specified in the I/O allocation setting is changed by the allocation management part instead of the user so that the storage capacity required for the storage of the input data based on the changed setting value is ensured. In this way, for the trouble of the user changing the allocation state between the input data and the storage area can be avoided. Furthermore, a change miss of the allocation state caused by the user can be prevented. Accordingly, unintentional stop of operations of the I/O unit can be prevented more reliably.

In addition, before the change of the allocation state between the input data and the storage area specified in the I/O allocation setting is confirmed, the allocation management part may inform the user of the allocation state between the input data and the changed storage area, and may facilitate the user an input to determine whether the allocation state is to be changed.

According to the above configuration, an allocation state unintended by the user can be prevented.

In addition, a display part that displays an input screen facilitating the input of the user may be further provided, and a plurality of I/O units connected to the controller may be managed.

In addition, a notification part may be further provided that notifies the user of the mismatch occurring in the allocation state when the allocation management part judges that the mismatch occurs in the allocation state.

According to the above configuration, by the notification of the notification part, the user can easily recognize that the mismatch occurs in the allocation state.

In addition, when the allocation management part judges that the mismatch occurs in the allocation state, the notification part may give a notification by displaying, on the input screen, warning information corresponding to the I/O unit which is within a plurality of the I/O units and in which the mismatch occurs in the allocation state.

According to the above configuration, the user can easily specify which is the I/O unit within a plurality of I/O units to which the mismatch occurs in the allocation state. Therefore, it is highly convenient.

In addition, when the allocation management part judges that the mismatch occurs in the allocation state, information indicating whether elimination of the mismatch of the allocation state is required or optional may be displayed on the input screen.

According to the above configuration, when viewing the input screen, the user can determine whether the elimination of mismatch of the allocation state is required or optional. Accordingly, only the minimum necessary elimination of mismatch is performed and thus the trouble of the user can be reduced.

Furthermore, a case in which the elimination of mismatch of the allocation state is required is a case that the storage capacity of the storage area specified in the I/O allocation setting is insufficient with respect to the storage capacity required for the storage of the input data based on the changed setting value. In addition, a case in which the elimination of mismatch of the allocation state is optional is a case that the storage capacity of the storage area specified in the I/O allocation setting is excessive with respect to the storage capacity required for the storage of the input data based on the changed setting value.

According to one embodiment of the disclosure, problems such as an operation stop or an incorrect operation of a controller caused by leaving out a mismatch that requires a change can be prevented.

The disclosure is not limited to the above-described embodiments, and various changes can be made in a range shown by the claims. Embodiments obtained by appropriately combining technical means respectively disclosed in different embodiments are also included in the technical range of the disclosure.

What is claimed is:

1. An I/O management apparatus, managing an I/O unit to which input devices are connected and a controller which controls the I/O unit, comprising:
   an I/O management information storing part, storing:
      a unit operation setting, indicating a relation between input data acquired and transferred from the input devices by the I/O unit and a setting value related to the input data, and
      an I/O allocation setting, indicating a relation between the input data and specification information that specifies a storage area, wherein the storage area is within a plurality of storage areas included in a storage part to which the input data is destinated and stored for the controller to access; and
   an allocation management part, judging, when the setting value is changed in the unit operation setting, whether a mismatch occurs in an allocation state between a required space for storing the input data due to the change to the setting value and the storage area specified in the I/O allocation setting by specifying a storage capacity required for a storage of the input data based on the changed setting value,
   wherein the change in the setting value changes a size of the input data.

2. The I/O management apparatus according to claim 1, wherein when the setting value is changed in the unit operation setting,
   the allocation management part specifies the storage capacity required for the storage of the input data based on the changed setting value by referring to profile information that indicates an allocation relation between the changed setting value and the storage area required for the storage of the input data based on the changed setting value.

3. The I/O management apparatus according to claim 1, wherein when the allocation management part judges that the mismatch of the allocation state occurs, the allocation state between the input data and the storage area specified in the I/O allocation setting is changed and a fact of being changed is confirmed so that the storage capacity required for the storage of the input data based on the changed setting value is ensured.

4. The I/O management apparatus according to claim 2, wherein when the allocation management part judges that the mismatch of the allocation state occurs, the allocation state between the input data and the storage area specified in the I/O allocation setting is changed and a fact of being changed is confirmed so that the storage capacity required for the storage of the input data based on the changed setting value is ensured.

5. The I/O management apparatus according to claim 3, wherein the allocation management part informs a user of the changed allocation state between the input data and the storage area before confirming the changed allocation state between the input data and the storage area specified in the I/O allocation setting, and facilitates the user an input to determine whether the allocation state is to be changed.

6. The I/O management apparatus according to claim 4, wherein the allocation management part informs a user of the changed allocation state between the input data and the storage area before confirming the changed allocation state between the input data and the storage area specified in the I/O allocation setting, and facilitates the user an input to determine whether the allocation state is to be changed.

7. The I/O management apparatus according to claim 1, further comprising a display part that displays an input screen facilitating the input of the user, and
managing a plurality of I/O units connected to the controller.

8. The I/O management apparatus according to claim 2, further comprising a display part that displays an input screen facilitating the input of the user, and
managing a plurality of I/O units connected to the controller.

9. The I/O management apparatus according to claim 3, further comprising a display part that displays an input screen facilitating the input of the user, and
managing a plurality of I/O units connected to the controller.

10. The I/O management apparatus according to claim 7, further comprising a notification part that notifies the user of the mismatch occurring in the allocation state when the allocation management part judges that the mismatch occurs in the allocation state.

11. The I/O management apparatus according to claim 8, further comprising a notification part that notifies the user of the mismatch occurring in the allocation state when the allocation management part judges that the mismatch occurs in the allocation state.

12. The I/O management apparatus according to claim 9, further comprising a notification part that notifies the user of the mismatch occurring in the allocation state when the allocation management part judges that the mismatch occurs in the allocation state.

13. The I/O management apparatus according to claim 10, wherein when the allocation management part judges that the mismatch occurs in the allocation state, the notification part gives a notification by displaying, on the input screen, warning information corresponding to the I/O unit which is within a plurality of the I/O units and in which the mismatch occurs in the allocation state.

14. The I/O management apparatus according to claim 11, wherein when the allocation management part judges that the mismatch occurs in the allocation state, the notification part gives a notification by displaying, on the input screen, warning information corresponding to the I/O unit which is within a plurality of the I/O units and in which the mismatch occurs in the allocation state.

15. The I/O management apparatus according to claim 12, wherein when the allocation management part judges that the mismatch occurs in the allocation state, the notification part gives a notification by displaying, on the input screen, warning information corresponding to the I/O unit which is within a plurality of the I/O units and in which the mismatch occurs in the allocation state.

16. The I/O management apparatus according to claim 7, wherein when the allocation management part judges that the mismatch occurs in the allocation state, information indicating whether elimination of the mismatch of the allocation state is required or optional is displayed on the input screen.

17. The I/O management apparatus according to claim 8, wherein when the allocation management part judges that the mismatch occurs in the allocation state, information indicating whether elimination of the mismatch of the allocation state is required or optional is displayed on the input screen.

18. The I/O management apparatus according to claim 10, wherein when the allocation management part judges that the mismatch occurs in the allocation state, information indicating whether elimination of the mismatch of the allocation state is required or optional is displayed on the input screen.

19. The I/O management apparatus according to claim 11, wherein when the allocation management part judges that the mismatch occurs in the allocation state, information indicating whether elimination of the mismatch of the allocation state is required or optional is displayed on the input screen.

20. The I/O management apparatus according to claim 13, wherein when the allocation management part judges that the mismatch occurs in the allocation state, information indicating whether elimination of the mismatch of the allocation state is required or optional is displayed on the input screen.

* * * * *